Patented June 23, 1953

2,643,248

UNITED STATES PATENT OFFICE 2,643,248

METHOD OF SULFURIZING TERPENE HYDROCARBONS

Elmer W. Brennan, Chicago, Ill., assignor to The Pure Oil Company, Chicago, Ill., a corporation of Ohio No Drawing. Application May 2, 1950, Serial No. 159,660

17 Claims. (Cl. 260—139)

This invention relates to the sulfurization of isoprenoid compounds having an alicyclic structure, as for example, the various terpenic hydrocarbons including both the mono- and dicyclic terpenes. More particularly, this invention relates to a method of preparing sulfurized terpene hydrocarbon products by the reaction of terpenes with sulfurizing agents and promoting the reaction by the presence of lead oxides.

In a related application entitled Method of Sulfurizing Terpene Hydrocarbons, Serial No. 136,157, filed December 30, 1949, it was disclosed that the sulfurization and phosphorization of terpenic hydrocarbons, to form lubricating and cutting oil additives, could be promoted by conducting the reaction in the presence of various sulfurization promoters, such as phosphorus sulfides, phosphorus chlorides, and sulfur chlorides. It has been discovered that another class of compounds, namely, lead oxides and their corresponding plumbic and plumbous salts, also serve to promote the sulfurization reaction to yield a product having a preponderance of desirable qualities as an additive and, at the same time, the reaction is free from excessive sludging and polymer formation. The product is found to be more compatible with mineral oil when made in accordance with this invention.

The reaction of isoprenoid compounds with sulfurizing agents, and in particular, free sulfur, has long been practiced to yield a product which, when compounded with lubricating oils, imparts desirable properties to the composition, such as, oxidation stability and non-corrosiveness to alloy bearings. The direct addition of sulfur to isoprenoid compounds is generally recognized to be one of the addition of the sulfur to the double bonds present in the molecule and a splitting off of water with those isoprenoids containing oxygenated groups. The products resulting from the reaction are complex and have been identified only partially as mono-, di-, and tetra-sulfides of the terpenic molecule. The sulfurization art has long recognized the importance of placing sulfur in the organic molecule in a form which is non-corrosive and yet active for the purposes desired. Ordinary sulfurization methods do not in all instances accomplish this result since uncombined sulfur is often present in the product, which crystallizes out when the reaction mass is cooled or the product may lose its free sulfur after it has been compounded with a lubricating oil. With certain starting materials, like the terpenes, the reaction may produce a product containing corrosive sulfur in the form of hydrogen sulfide incorporated in the reaction mass or a portion of the terepene may react to produce monosulfides and mercaptans which are also corrosive. If water is formed during the reaction there results the formation of sulfurous acids in the presence of sulfur in this corrosive state and the undesirability of the product is increased. In addition, the presence of water in the product tends to produce a cloudy appearance in the final composition with the lubricating oil with the result that it is unmarketable or may become so on standing or storage. Often when the sulfurization reaction is conducted at too high a temperature the terpene molecules are partially cracked and these cracked products tend to reduce the flash point of the final product.

Many attempts of greater or lesser success have been made to improve the product of the sulfurization of terpenic hydrocarbons. If steam distilled pine oil, a typical terpene obtained from the distillation of crude turpentine, and having as its main constituent alphaterpineol, B. P. 217° to 218° C., being an alcohol of the cyclohexane series often designated as a monocyclic terpene, is heated with elementary sulfur, as the temperature rises the sulfur melts and begins to dissolve in the pine oil. At about 350° F. ebullition takes place and an exothermic reaction sets in with consequent rise in temperature to about 375° F., at which point sulfur is dissolved and complete homogeneity is reached. If this mass is cooled the sulfur tends to crystallize out and the product will have a low sulfur content and a high polymer content, in addition to exhibiting most of the other undesirable characteristics aforementioned. By prolonged heating of the sulfur and pine oil after homegeneity, some of these difficulties can be eliminated. What has been said of pine oil is generally true of the other members of the class of isoprenoid compounds. Although numerous methods have been found to eliminate most of the difficulties enumerated, the means employed are often tedious, time-consuming and expensive.

It has been discovered that the sulfurization of terpene hydrocarbons, at a temperature of at least about the melting point of sulfur and not below the temperature at which free sulfur precipitates, can be materially accelerated and promoted by conducting the reaction in the presence of lead oxides, including lead tetraoxide, $Pb_3O_4$, lead sesquioxide, $Pb_2O_3$, lead peroxide, $PbO_2$, lead monoxide, $PbO$, lead suboxide, $Pb_2O$. Instead of the lead oxides, the metal salts of plumbic, metaplumbic, orthoplumbic and plumbous acids may be used. Examples of these salts are calcium orthoplumbate, potassium metaplumbate, and sodium plumbite.

Accordingly, it is the main object of this invention to provide a method of promoting sulfurization of terpene hydrocarbons and particularly, mono- and dicyclic terpenes.

It is a second object of this invention to provide lead oxide promoters for the sulfurization of terpenes and a method for conducting the promoted reaction.

It is a third object of this invention to provide as sulfurization promoters various lead oxides and salts such as: lead tetraoxide, lead sesquioxide, lead peroxide, lead monoxide, lead suboxide, calcium orthoplumbate and potassium metaplumbate.

It is a fourth object of this invention to provide a method for the sulfurization of terpene hydrocarbons wherein the chemical combination of the sulfurizing agent and the terpene is materially aided, thereby yielding a final product having an increased sulfur content and a reduced polymer or side reaction product content.

Other objects will become apparent from the following description of the invention.

In conducting the sulfurization of terpenic hydrocarbons, in accordance with this invention, the terpenes and sulfurizing agent, such as elemental sulfur, and lead oxide promoter, are mixed thoroughly and the mixture heated under reflux at atmospheric pressure, to a temperature of about 248° to 435° F. This temperature range has for its lower limit the melting point of sulfur and as its upper limit the end boiling point of pine oil and represents the broad temperature limits in which the reaction may be conducted. Temperatures of about 240° to 248° F. are sufficient to create a homogeneous mass but the rate of reaction of the sulfur with the terpene is slow. If a closed system is used for the reaction and pressure is allowed to build up, due to any vaporization of reactants, then temperature adjustments, by control of rate of heating and amount of pressure, between 248° to 435° F. or beyond, are possible. The preferred temperature of initial heating is between about 300° to 360° F. at which temperature the sulfur within the homogeneous mass begins to react at an appreciable rate with the terpene. At this point, an exothermic reaction takes place and no further heating is necessary for a period of about 30 to 60 minutes, depending on the mass of reactants and the rate of heat dissipation.

As soon as the exothermic reaction begins to subside, that is, at least before the mass has cooled to the point wherein sulfur begins to precipitate, about 200° F., heat is again applied and the reaction temperature maintained at about 300° to 400° F., preferably at about 310° to 350° F., for a period sufficient to complete the reaction of reactable sulfur with the terpene. When the reaction mass is under reflux, sufficient heat may be applied to keep the mass at its boiling temperature. This temperature will vary with the type of terpene used. This last heating period is variable between about 4 to 16 hours, depending on the nature of the terpene being treated and the average reaction temperature maintained.

The end point of the reaction is determined by withdrawing a portion of the mass, cooling to room temperature, and allowing it to stand. The precipitation of any unreacted sulfur is an indication that the reaction is incomplete. If too large an amount of sulfur, over the stoichiometric excess, is employed, no amount of heating will prevent sulfur precipitation on cooling. Proportions of sulfurizing agent and terpene are adjusted to maintain approximately enough sulfur present to yield a product containing from about 20% to the amount which it is possible to stoichiometrically react with the terpene. The promoter may be incorporated at the beginning of the reaction or added in increments during the reaction, to allow thorough dispersion of promoter in the sulfur-terpene mass.

The final product, resulting from this reaction, may be used as a cutting oil additive or a lubricating oil additive. Whether or not the end product is purified will depend on the use that is to be made of it. Cutting oil additives do not require strict purification, whereupon lubricating oil additives will require some purification and removal of unreacted low boiling constituents therefrom.

The total amount of sulfur used should, of course, be at least equal to the amount stoichiometrically necessary for combining with all of the terpene present. However, good practice dictates that an excess of from 5% to 10% is preferable, although the use of larger than 10% excess is sometimes expedient. Although sulfur is the preferred sulfurizing agent, the process may be carried out using other sulfurizing agents as hydrogen sulfide and the sulfur halides. The choice of the particular sulfurizing agent, or mixture thereof, will depend on the type of product desired.

The advantages of the present invention are more fully pointed out by comparison of the following examples:

*Example 1.*—85% by weight Dipentene 122 and 15% by weight sulfur were mixed and heated to 330° F. at atmospheric pressure under reflux for 30 hours. During the reaction and at the completion of the experiment the reaction product contained a large quantity of free sulfur and unreacted dipentene. The product was not compatible with mineral oil and exhibited a precipitation in the form of polymer insolubles when added thereto. The same result was obtained when using 70% by weight of Dipentene 122 and 30% by weight of sulfur for the reaction. The product displayed a very loose black scale on subjection to the copper strip test.

*Example 2.*—58% by weight of dipentene and 42% by weight of sulfur were heated together at atmospheric pressure under reflux. After 30 hours of heat at 335° to 348° F., the product contained a large amount of free sulfur and unreacted dipentene. In addition the product was unfit for use with a mineral oil due to its polymer content, color and loose black scale on copper strip test.

*Example 3.*—60% by weight of Dipentene 122, and 42% by weight of sulfur, with 1% of red lead, $Pb_3O_4$, based on the weight of Dipentene 122 used, were heated together under reflux at atmospheric pressure to a temperature of 330° F. When the temperature reached about 330° F., an exothermic reaction occurred which maintanied the reaction temperature at about 330° F. for about 40 minutes. During this period, it was unnecessary to add heat. When the exothermic reaction had subsided, heat was again applied and the temperature maintained at about 330° F. for about 5½ hours. A sample of the reaction mass, at this point, when held at room temperature for about 15 hours, gave no signs of the precipitation of free sulfur. The main reaction mass was heated for a period of about 17 hours and filtered. The final sulfur content was 23.9%. There existed a residue from the filtration, having the appearance and characteristics of a material not unlike lead monosulfide, PbS. The product gave a copper strip test which was iridescent, was completely compatible with mineral oil and imparted no undesirable color characteristics thereto.

The foregoing examples illustrate the improvement attainable when the sulfurization reaction is promoted using lead oxides. The copper strip test mentioned is conducted for the purpose of indicating the activity of any sulfur that may be present. The test serves as a guide to the chemical characteristics and possible uses or applications of the product. The copper strip test is conducted by immersing a polished copper strip in the reaction mixture, or in a sample of the finished product, maintained at a temperature of at least about 300° to 330° F. for one to three minutes. The test results are ascertained by observance of the color of the copper strip. The color observed will vary from a "peacock" color to a black discoloration. Intermediate between these extremes is an iridescent to grey or dark grey coloration, the latter indicating a borderline product as far as use thereof for lube oil additive purposes is concerned, and the former indicating a "passable" product for the same purpose. The grey or black strips may or may not be accompanied with a loosely bound sulfide scale.

The lead oxides and plumbate or plumbic salts, used in accordance with this invention, may be of the ordinary commercial variety. For example, red lead, having a molecular weight of 685.83, and containing 0.01% acid insoluble matter, 0.000% chlorine, 0.005% nitrate, 0.005% copper, 0.002% iron, and 0.0001% manganese, is operable for use as a promoter herein.

Thus, it is apparent that by conducting the sulfurization of terpenes in the presence of lead oxides, an improved product can be obtained in a shorter time, with the use of less heat, and the sulfur content of the product is more tightly bound in the terpene molecule. The sulfurized product is more compatible wtih mineral oils and imparts an increased oxidation resistance thereto. In addition, the product contains a higher percentage of sulfur than is attainable when the reaction is conducted in the absence of a promoter. The products of the present invention can be used, as prepared, for additives in lubricating or cutting oils or may be stripped of any unreacted or low boiling constituents before they are so compounded. Clay filtration is one means of improving the color characteristics of the product for certain purposes.

The typical commercial terpene, Dipentene 122, used to demonstrate the present invention, is a product made by the Hercules Powder Company, commonly referred to by the trade name, Dipentene 122. It is a mixture of mono- and dicyclic terpenes including dipentene, alpha terpinene, terpinolene, alpha pinene, beta pinene and 2,4 (8) paramenthadiene, with para-cymene and para-menthane also present. Any one, or mixtures, of these terpenes may be used as starting materials for the preparation of an additive, in accordance with this invention. The process is equally applicable to all of the monocyclic and dicyclic terpenes, which will react with a sulfurizing agent, at a temperature of about the melting point of sulfur to a temperature not exceeding the boiling point, or decomposition point, of the terpene. Pine oil, turpentine, terpineol, carene, sabinene, and the diterpenes may also be used to the purposes of this invention. The specific example given was conducted under atmospheric pressures. However, it is possible to conduct the reaction using sub-atmospheric or super-atmospheric pressures.

The amount of lead oxide promoter, used in accordance with this invention, may be from 1% to 15% by weight based on the total weight of isoprenoid hydrocarbon to be treated. The addition of larger amounts has no beneficial effect. For most reactions, from 1% to 5% of lead oxide promoter will give the desired results. The promoter may be added at the beginning of the reaction or it may be added in incremental portions during the reaction. The amount of each portion of promoter added, during the incremental addition, will be equivalent to about 20% of the total mass of lead oxide promoter used. By conducting the sulfurization reactions in this manner, it is possible to take advantage of the exothermicity produced and thus maintain a high reaction rate during the major part of the process.

The invention has been demonstrated by specific examples, which illustrate the effectiveness and efficiency in which the sulfurization reaction may be conducted with the new promoter. However, the illustration given should not be construed as limiting the invention. The only limitations appear in the following claims.

I claim:

1. The method, for preparing sulfurized isoprenoid hydrocarbons, comprising reacting said isoprenoid hydrocarbons with a sulfurizing agent present in an amount at least stoichiometrically equivalent to that necessary to react with said isoprenoid hydrocarbons, at a temperature at least above the melting point of sulfur but below the decomposition point of said isoprenoid hydrocarbons, and promoting said reaction by the presence of a small amount of a promoter selected from the group consisting of lead oxides, hydrated lead oxides, metal salts of lead acids and their mixtures.

2. The method, in accordance with claim 1, in which the promoter is lead tetraoxide.

3. The method, in accordance with claim 1, in which the promoter is lead sesquioxide.

4. The method, in accordance with claim 1, in which the promoter is lead peroxide.

5. The method, in accordance with claim 1, in which the promoter is calcium orthoplumbate.

6. The method, in accordance with claim 1, in which the promoter is potassium metaplumbate.

7. The method, in accordance with claim 1, in which the promoter is a lead oxide present in from 1% to 15% by weight, based on the amount of isoprenoid hydrocarbon.

8. The method, in accordance with claim 1, in which the sulfurizing agent is sulfur.

9. The method, in accordance with claim 1, in which the isoprenoid compound is selected from the group consisting of monocyclic and dicyclic terpenes.

10. The method, in accordance with claim 1, in which the temperature of the reaction is between about 240° to 400° F.

11. The method of sulfurizing mono- and dicyclic terpenes by reaction with sulfur, comprising heating said terpenes with an amount of sulfur at least stoichiometrically sufficient to react with said terpenes to a temperature of about 300° to 360° F. in the presence of about 1% to 15% by weight of a promoter selected from the group consisting of lead oxides, hydrated lead oxides, metal salts of lead acids and their mixtures, until an exothermic reaction begins, interrupting said heating until said exothermic reaction begins to subside, then heating the reactants to a temperature of about 300° to 400° F. until a product is obtained from which free sulfur does not precipitate on cooling to room temperature.

12. The method, in accordance with claim 11, in which the mono- and dicyclic terpenes are selected from the group consisting of dipentene, alpha pinene, beta pinene, alpha terpinene, terpinolene, and their mixtures.

13. The method, in accordance with claim 11, in which the promoter is lead tetraoxide.

14. The method, in accordance with claim 11, in which the promoter is lead sesquioxide.

15. The method, in accordance with claim 11, in which the promoter is lead peroxide.

16. The method, in accordance with claim 11, in which the promoter is calcium orthoplumbate.

17. The method, in accordance with claim 11, in which the promoter is potassium metaplumbate.

ELMER W. BRENNAN.

References Cited in the file of this patent

UNITED STATES PATENTS

| Number | Name | Date |
|---|---|---|
| 2,291,404 | Morway | July 28, 1942 |